March 24, 1931.  B. B. ANNIS  1,797,223
RUBBER BEARING OR JOURNAL FOR SHAFTS
Filed Dec. 27, 1926
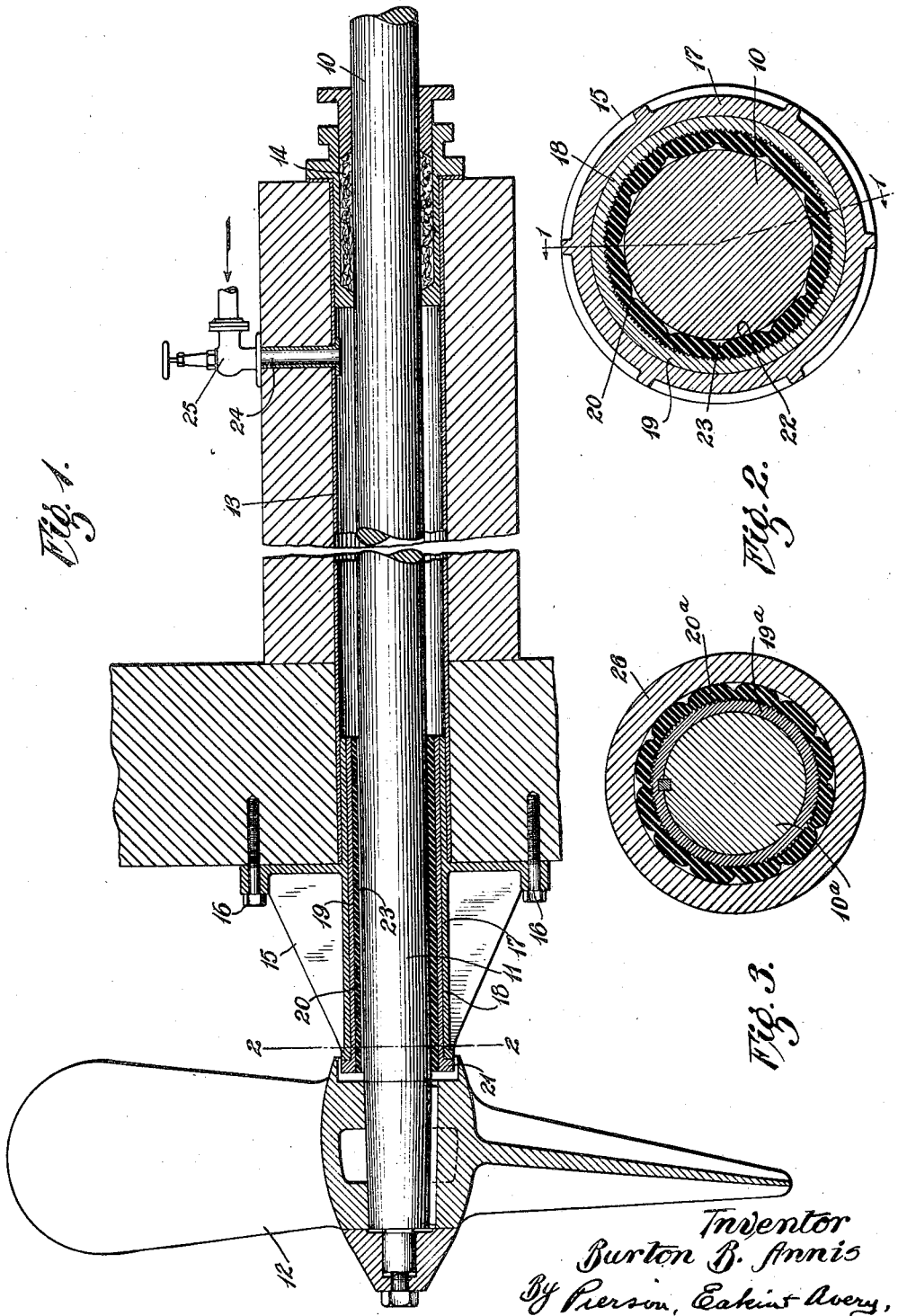
Inventor
Burton B. Annis
By Pierson, Eakins Avery,
Attys.

Patented Mar. 24, 1931

1,797,223

UNITED STATES PATENT OFFICE

BURTON B. ANNIS, OF AKRON, OHIO, ASSIGNOR TO THE B. F. GOODRICH COMPANY, OF NEW YORK, N. Y., A CORPORATION OF NEW YORK

RUBBER BEARING OR JOURNAL FOR SHAFTS

Application filed December 27, 1926. Serial No. 157,245.

This invention relates to resilient rubber shaft bearings or journals of the water lubricated type and it has for its object to provide certain improvements in apparatus of this class looking toward a reduction in the cost of manufacture and better action of the bearing or journal in service.

Of the accompanying drawings, Fig. 1 is a longitudinal section of a marine propeller shaft having a bearing constructed in accordance with my invention, said section being taken on the line 1—1 of Fig. 2.

Fig. 2 is a transverse section on a larger scale taken on the line 2—2 of Fig. 1.

Fig. 3 is a cross-section showing a bearing and journal combination, in which the journal embodies my invention.

Referring at first to Figs. 1 and 2, 10 is a propeller shaft having a journal portion 11 near its outer end and a propeller 12 fixed to the outer end of the shaft. 13 is the stern tube of the vessel fixed in the hull of the latter and having a stuffing box 14 at its inner end through which the shaft passes and by which the inner shaft opening is sealed again leakage. 15 is a metallic bearing support or housing fixed by lag screws 16 to the hull of the vessel and having a tubular body 17, the inner end portion of which telescopes within the stern tube 13.

18 is my improved shaft bearing consisting in this instance of an outer metallic shell or sleeve 19, preferably of brass or bronze composition and removably mounted with a close position fit in the housing 15, and a bearing portion 20 consisting of a sleeve or tube of resilient, vulcanized rubber composition, secured to the inner surface of the metal sleeve 19, which latter is preferably roughened and the rubber united thereto by vulcanization, either with or without the interposition of a suitable cement or other adhesion medium. The outer end of the sleeve 19 is shown with a stop flange 21 abutting against the outer end of the housing 15.

The inner surface of the rubber body 20 adjacent the shaft 10 has a fluted formation consisting of relatively broad shaft-contacting portions 22 alternating with longitudinal grooves 23, the purpose of the grooves being to carry water through the bearing to lubricate the latter. While the longitudinal course of the flutes and grooves may be straight and parallel to the shaft axis, this feature is not essential. To facilitate the circulation or flow of lubricating water through the bearing a pipe 24 leading from a suitable source of water supply and provided with a stop valve 25 is led into the stern tube 13, the water therefrom finding its way into the grooves 23 at the inner ends of the latter and being discharged at their outer ends.

By reason of the flat or slightly convex shape of the bearing surfaces of the flutes, or other non-concentric shape which may be imparted thereto, these surfaces are substantially tangent to the shaft at zero pressure between the two. As the pressure increases, accompanied by deformation of the resilient rubber flutes, fresh portions of said surfaces are brought into action and the effective bearing surface rapidly increases, thus diminishing the wear and at the same time effectively cushioning the shaft. Another important effect is that the increased supporting surface thus provided keeps the pressure per unit of surface relatively low and thereby avoids squeezing out of the water film from between the shaft and the rubber surfaces.

The inner faces of the rubber shaft-contacting portions or flutes 22 of the bearing may be either flat or slightly convex throughout the whole or the major portion of their width and their marginal portions defining the grooves 23 make an acute angle with the surface of the shaft 10 which facilitates the carrying of the water from the grooves across the rubber bearing surfaces by the rotation of the shaft and avoids in considerable measure the wiping or squeegee action which would be incident to the use of sharp rubber corners or edges defining the grooves.

By making the effective width of the rubber flutes 22 relatively great in comparison with that of the grooves 23, I provide for utilizing the major portion of the exposed inner surface of the rubber bearing as a support for the shaft or for substantially the lower semi-circle of said shaft in the case illustrated. The actual width of this supporting surface on each flute may vary somewhat with the conditions as to wear and pressure, and the resiliency of the rubber. The rubber bearing forms a cushion for the shaft and this involves some deformation due to the weight of the shaft and the propeller or other member attached thereto when said shaft is installed in a horizontal or nearly horizontal position. These bearings as initially fitted preferably have small or zero clearance between the flutes and the shaft when the rubber is not under compression or they may even be fitted with a slight initial compression on all flutes. The weight of the shaft and propeller may compress the flutes on the lower side of the bearing sufficiently to produce a slight clearance on the upper side, and this facilitates the circulation of water between the rubbing surfaces due to the rotation of the shaft. So long as water is present between these surfaces the coefficient of friction is very small and the wear on either the bearing or the shaft is at a very slow rate even in the presence of sand or other abrasive matter in the water, the yielding nature of the rubber and the presence of the grooves permitting the sand to work out without damage.

These bearings may be used on vertical shafts for pumps, turbines, etc., as well as on horizontal shafts for a variety of purposes.

The fluted bearings of the present invention are less expensive to manufacture than the type of rubber bearing heretofore commonly used having a helical groove on its interior for the circulation of the lubricating water, as the longitudinal flutes and grooves can be readily molded in the rubber whereas the helical groove has been commonly made by a grinding operation. This bearing may also be made somewhat more resilient with an equal or even greater proportion of bearing surface and appears to be equally capable of clearing itself from sand. Having several water channels in place of only one or two and less wiping or squeegee action it is somewhat easier to keep properly lubricated.

Instead of making the stationary member or bearing of fluted rubber the journal may be made of that material. Fig. 3 shows such an arrangement in which 15ª is the rotary shaft, 19ª is a brass or other metallic sleeve keyed thereon, 20ª is a longitudinally grooved and fluted resilient rubber journal or bearing sleeve vulcanized upon the sleeve 19ª, and 26 is the fixed metallic bearing in which said journal rotates.

Other modifications in form or arrangement may be made without departing from the scope of my invention.

An important advantage of the construction described is that the flute, being of increasing width from its bearing surface toward its base, is well adapted to resist lateral tilting and consequent cramping and binding of the flute against the shaft, the tangential force applied to the flute by rotation of the shaft being sustained by a tension zone of the rubber so disposed obliquely to the surface of the shaft, along the non-radial side face of the flute, that rotation of the edge of the "land" or bearing surface of the flute with the said tension zone of the rubber as a radius would swing the said edge away from the shaft and not toward it, the effect being that the center of such rotation in the rubber element is so far off-set from the bearing surface that a toggle action of the rubber against the shaft, such as occurs when a land having radial side faces is inadequately lubricated, is avoided.

I claim:

1. The combination of a shaft and a bearing therefor, the bearing portion of one of said members being of resilient rubber composition in the form of alternating longitudinal supporting portions and grooves, the margins of said supporting portions making acute angles with the complemental member.

2. A shaft bearing having a series of longitudinal supporting portions alternating with lubricating grooves, said supporting portions being of resilient rubber composition and having margins shaped to make acute angles with the shaft.

3. A shaft bearing having a series of longitudinal supporting portions alternating with lubricating grooves, said supporting portions being of resilient rubber composition and having slightly convex bearing surfaces.

4. A shaft bearing comprising a metallic sleeve, and an internal series of longitudinal, resilient, rubber bearing members supported thereby and having margins shaped to make acute angles with the shaft.

5. A shaft bearing comprising a metallic sleeve, and a rubber sleeve vulcanized to the inner surface thereof, said rubber sleeve having resilient shaft-supporting portions whose margins are shaped to make acute angles with the shaft.

6. A shaft bearing comprising a metallic sleeve, and a resilient rubber sleeve vulcanized to the inner surface thereof and including a series of longitudinal shaft-supporting portions formed with slightly convex bearing surfaces alternating with lubricating grooves.

7. The combination of a shaft and a bearing therefor, the two said members having respectively a metal bearing surface and a surface of soft rubber which contact with each other in relative rotation, one of the said surfaces being cylindrical and the other being formed with ribs extending in a generally longitudinal direction, each rib being of such shape in cross-section as to define with the said cylindrical surface a bight tapering to an acute apex at the contact area of the members to effect the wiping of a film of water into the said area for water-lubrication of the bearing.

8. A combination as defined in claim 7 in which the cylindrical surface is that of the shaft and the ribbed surface is that of the bearing.

9. A combination as defined in claim 7 in which the metal surface is that of the shaft and the rubber surface is that of the bearing.

10. A combination as defined in claim 7 in which the metal surface is that of the shaft and is cylindrical and in which the rubber surface is that of the bearing.

In witness whereof I have hereunto set my hand this 20th day of December, 1926.

BURTON B. ANNIS.